US008277304B1

(12) United States Patent
Rasmussen et al.

(10) Patent No.: US 8,277,304 B1

(45) Date of Patent: Oct. 2, 2012

(54) ALIGNING A GAMING MACHINE REEL TO A HOME POSITION

(75) Inventors: James M. Rasmussen, Chicago, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 1094 days.

(21) Appl. No.: 10/932,769

(22) Filed: Sep. 2, 2004

(51) Int. Cl.

| | |
|---|---|
| ***G07F 17/34*** | (2006.01) |
| ***A63F 5/04*** | (2006.01) |
| ***A63F 9/24*** | (2006.01) |
| *G05B 19/40* | (2006.01) |
| *G01D 5/34* | (2006.01) |

(52) U.S. Cl. ........... 463/20; 463/21; 463/18; 273/143 R; 273/143 C; 318/685; 250/231.13

(58) Field of Classification Search .................... 463/20, 463/16–18, 21; 273/143 R, 143 C; 318/685; 250/231.13

See application file for complete search history.

(56) References Cited

U.S. PATENT DOCUMENTS

| | | | | |
|---|---|---|---|---|
| 3,913,922 A | | 10/1975 | Richards et al. | 273/143 R |
| 4,071,246 A | | 1/1978 | Hooker | 273/143 R |
| 4,095,795 A | | 6/1978 | Saxton et al. | 463/20 |
| 4,099,722 A | | 7/1978 | Rodesch et al. | 273/143 |
| 4,138,114 A | | 2/1979 | Andersen | 273/143 R |
| 4,191,377 A | | 3/1980 | Burnside | 273/143 R |
| 4,238,127 A | | 12/1980 | Lucero et al. | 273/143 R |
| 4,262,906 A | | 4/1981 | Heywood | 273/143 R |
| 4,299,388 A | | 11/1981 | Resch et al. | 463/20 |
| 4,411,428 A | | 10/1983 | Nicolaus | 273/143 R |
| 4,421,310 A | | 12/1983 | Williams | 273/143 R |
| 4,492,379 A | | 1/1985 | Okada | 273/143 R |
| 4,534,560 A | | 8/1985 | Okada | 273/143 R |
| 4,618,150 A | | 10/1986 | Kimura | 273/143 R |
| 4,637,611 A | * | 1/1987 | Hamada | 273/143 R |
| 4,660,833 A | | 4/1987 | Dickinson et al. | 463/20 |
| 4,837,728 A | | 6/1989 | Barrie et al. | 364/412 |
| 4,911,449 A | | 3/1990 | Dickinson et al. | 463/20 |
| 4,912,389 A | * | 3/1990 | Eguchi | 318/696 |
| 5,058,893 A | | 10/1991 | Dickinson et al. | 273/143 R |
| 5,102,136 A | | 4/1992 | Heidel et al. | 273/143 R |
| 5,209,477 A | | 5/1993 | Heidel et al. | 273/143 R |
| 5,220,161 A | * | 6/1993 | Geis et al. | 250/231.13 |
| 5,423,540 A | | 6/1995 | Taxon | 273/143 R |
| 5,683,296 A | * | 11/1997 | Rasmussen | 463/20 |
| 5,729,006 A | | 3/1998 | Maeda | 250/231.13 |
| 5,839,957 A | * | 11/1998 | Schneider et al. | 463/20 |

(Continued)

FOREIGN PATENT DOCUMENTS

| | | |
|---|---|---|
| GB | 1550732 | 8/1979 |

(Continued)

*Primary Examiner* — Melba Bumgarner
*Assistant Examiner* — Frank M Leiva
(74) *Attorney, Agent, or Firm* — Schwegman Lundberg & Woessner, P.A.

(57) ABSTRACT

A gaming machine having spinning reels and methods for operating the gaming machine use a computer and/or software instructions to align a home position of each spinning reel or a home position of a reel strip mounted on each spinning reel with a target position on the gaming machine. An optical detector unit using an optical strip on the spinning reel may be used to align a home position with a pay line on the gaming machine.

36 Claims, 10 Drawing Sheets

U.S. PATENT DOCUMENTS

| | | | | |
|---|---|---|---|---|
| 5,938,196 | A * | 8/1999 | Antoja | 273/143 C |
| 5,938,529 | A * | 8/1999 | Rodesch et al. | 463/20 |
| 6,347,795 | B1 * | 2/2002 | De Leljer | 273/143 R |
| 6,394,900 | B1 | 5/2002 | McGlone et al. | 463/20 |
| 2001/0004341 | A1 * | 6/2001 | Suzuki et al. | 369/44.27 |
| 2002/0107067 | A1 * | 8/2002 | McGlone et al. | 463/20 |
| 2004/0053674 | A1 * | 3/2004 | Nguyen et al. | 463/20 |
| 2004/0102244 | A1 * | 5/2004 | Kryuchkov et al. | 463/32 |

FOREIGN PATENT DOCUMENTS

| | | |
|---|---|---|
| GB | 2072395 | 9/1981 |

* cited by examiner

ALIGNING A GAMING MACHINE REEL TO A HOME POSITION

FIELD OF THE INVENTION

The present invention relates generally to gaming machines, and more particularly, to spinning reel type gaming machines.

BACKGROUND

In general, standard mechanical gaming machines include a plurality of reels with display symbols around the perimeters of reel strips attached to the reels. In the course of normal game play the reels are spun and stopped at a given reel stop position. The results of the game play typically depend on which of the symbols on each of the reels aligns with a pay line on the gaming machine. Generally, the reels are stopped with a center of a symbol on each reel aligned with the pay line. However, the alignment of a reel may be required.

Reel and reel strip alignment issues exist in gaming machines based on a number of factors, such as dimensional tolerance, manufacturing variations, assembly errors, etc. For this reason, there needs to be a method for final alignment of the reel strips to the pay line.

SUMMARY

The above mentioned problems are addressed by the present invention and will be understood by reading and studying the following specification. In embodiments, a gaming machine and methods for operating the gaming machine include a reel having a home position, a reel motor to rotate the reel, a detector for determining when the home position is aligned with a target position on the gaming machine, where the alignment is conducted under software control. The aligned home position may be a home position located at a specified position on the reel or a home position of a reel strip mounted on the reel.

These and other aspects, embodiments, advantages, and features will become apparent from the following description and the referenced drawings.

DETAILED DESCRIPTION

Figure 1:
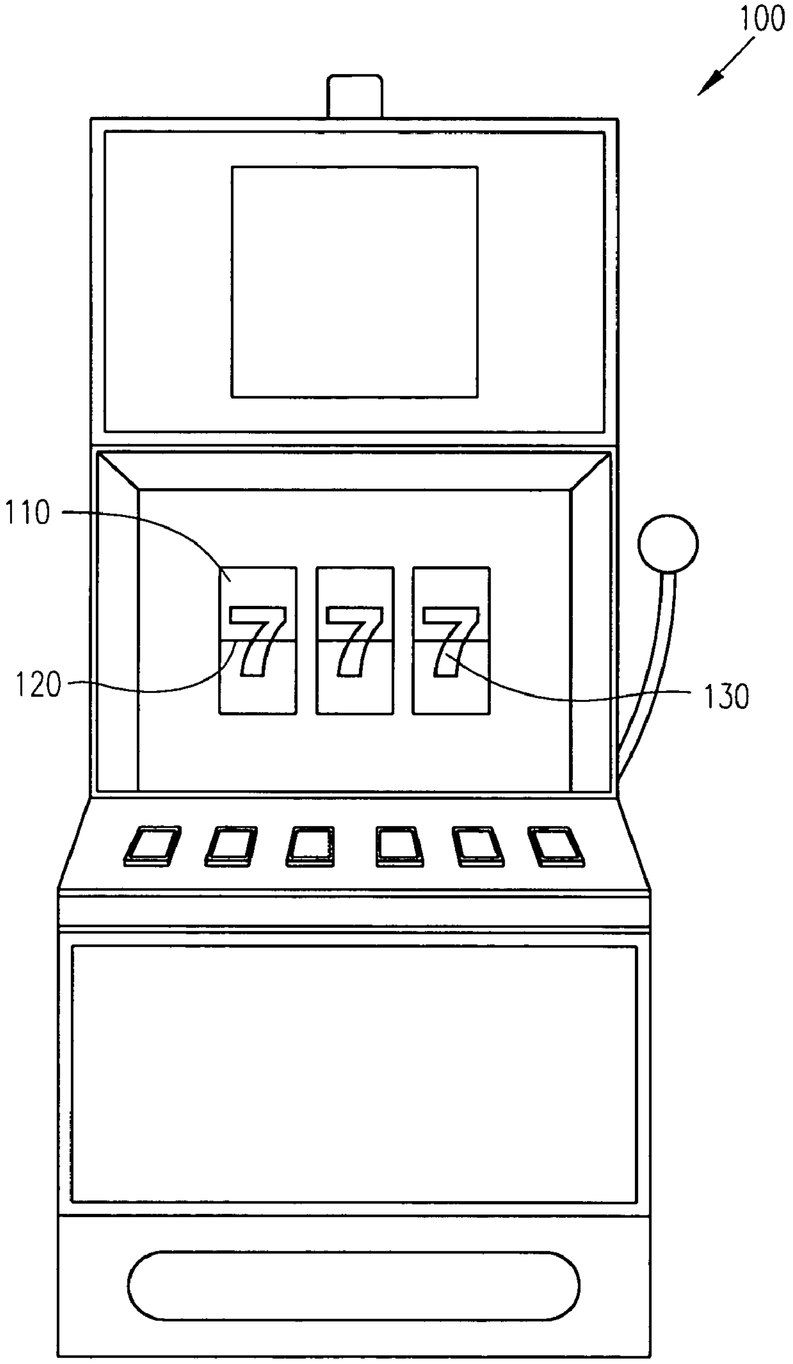
FIG. 1 illustrates an embodiment of gaming machine having spinning reels on which symbols are arranged on the perimeter of the spinning reels for game play, where each spinning reel has a home position aligned with a pay line of the gaming machine in accordance with the teachings of the present invention.

In the following detailed description of the invention, reference is made to the accompanying drawings which form a part hereof, and in which are shown by way of illustration, specific embodiments in which the inventions may be practiced. These embodiments are described in sufficient detail to enable those skilled in the art to practice the present invention. Other embodiments may be utilized and structural, logical, and electrical changes may be made without departing from the scope of the invention. The various embodiments herein are not necessarily mutually exclusive, as some embodiments can be combined with one or more other embodiments to form new embodiments. The following detailed description is, therefore, not to be taken in a limiting sense, and the scope of embodiments of the present invention is defined only by the appended claims, along with the full scope of equivalents to which such claims are entitled.

As used herein, the term "gaming machine" refers to a machine into which a coin or token is deposited, and/or which is activated by a card or token associated with data regarding non-monetary chattel, to play a game that uses a video display and/or an electromechanical device with a spinning reel. The gaming machines include slot machines and push button machines. The gaming machines include coin operated machines, machines having a serial interface, machines have a serial interface and/or a parallel interface, and machines having a wireless interface. Gaming machines also include gaming tables capable of being initiated by a card or token.

Mechanical methods to align the reels of a gaming machine generally require opening at least part of the gaming machine. To align a reel with a pay line that is typically on the door of the gaming machine, the door must be opened to access the reels, which has proven to be a very tedious process. Such a mechanical method is increasingly difficult if the reels must be removed from the gaming machine to make mechanical adjustments.

Alignment of the reel to a target position on a gaming machine may take several forms. A home position of the reel may be aligned with the target position on the gaming machine. A home position provides a reference position for the location of the reel. The home position may be a specified location in or on the reel cage. One form of alignment includes an alignment of this specified location in the reel with a target position on the gaming machine. The target position may be a pay line of the gaming machine.

A home position for the reel may also be a relative orientation of a reel strip mounted on the reel. This relative orientation may include a home position for the reel strip that is mounted on the reel. It is typically desired to have the home position of a reel strip aligned with or correlated to a home position of the reel on which it is mounted. This correlation provides a registration of the reel strip with the reel. Another form of alignment occurs when a reel strip, out of registration with its reel, is aligned with a target position on the gaming machine. The target position may be a pay line of the gaming machine.

FIG. 1 illustrates an embodiment of gaming machine 100 having a spinning reel 110 on which symbols 130 are arranged on the perimeter of spinning reel 110 for game play, where spinning reel 110 may be properly aligned without opening gaming machine 100. Spinning reel 110 has a home position aligned with a pay line 120 of gaming machine 100. The alignment may be realized as an alignment of the home position of the reel or an alignment of a home position of a reel strip mounted on spinning reel 110. The alignment is controlled by software. Such alignment may include alignment of an optic strip and an optic sensor with alignment of a reel strip to a reel cage and a reel assembly to a pay line performed with mechanical adjustment which may include human intervention. The software may be integral to gaming machine 100 or located in a computer remote from gaming machine 100, where the computer executable instructions provide control signals to gaming machine 100 via communication lines to align the home position of spinning reel 110 to pay line 120. Each spinning reel in gaming machine 100 is under software control. Gaming machine 100 may include a number of spinning reels similar to spinning reel 110. In an embodiment, gaming machine has three spinning reels. In another embodiment, gaming machine 100 has four spinning reels. In an embodiment, gaming machine 100 has five spinning reels. Gaming machine 100 is not limited as to the number of spinning reels. Additionally gaming machine 100 may include a number of pay lines, such as but not limited to, one, three, or five pay lines.

Figure 2:
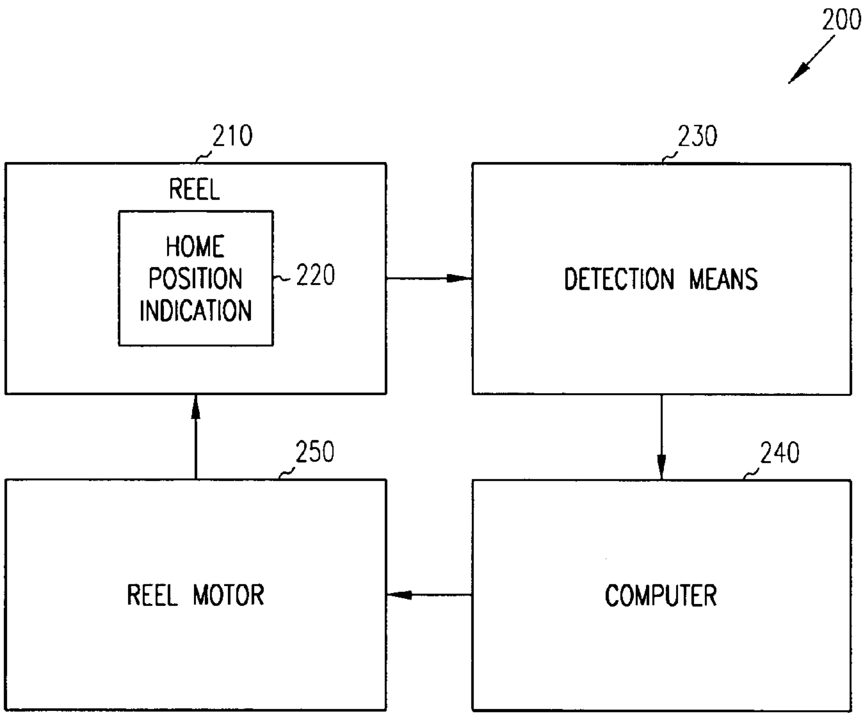
FIG. 2 shows a block diagram of an embodiment of a gaming machine having means for aligning a home position of a reel with a target position on the gaming machine in accordance with the teachings of the present invention.

FIG. 2 shows a block diagram of elements of an embodiment of a gaming machine 200 having means for aligning a home position of a reel 210 with a target position on gaming machine 200. Gaming machine 200 includes reel 210, a detection means 230, a computer 240, and a reel motor 250. Reel 210 spins according to the game play of the particular game being run on gaming machine 200. Reel 210 includes a home position indicator 220 such that home position indicator 220 is used to align a home position of reel 210 with a target position of gaming machine 200. The home position of reel 210 may be a home position on a reel cage of reel 210 or a home position on a reel strip mounted on reel 210. The target position of gaming machine 200 may be correlated to a pay line of gaming machine 200.

Home position indicator 220 may be realized in different formats depending on the configuration of gaming machine 200. Homing position indicator 220 may be realized as a magnetic indicator, an optical indicator, an electro-optic indicator, or a mechanical indicator. The format of home position indicator 220 may provide a parameter for determining reel alignment by detection means 230 implemented in gaming machine 200. In an embodiment, detection means 230 is realized in a configuration as a magnetic detector unit, an optical detector unit, an electro-optic detector unit, or a mechanical detector unit corresponding to the format of home position indicator 220. Detection means 230 is used to determine when the home position of reel 210 is aligned with a target position on gaming machine 200. The target position may be a position such that alignment with home position indicator 220 results in a symbol on reel 210 having a specific arrangement with a pay line of gaming machine 200. The target position may be correlated to the pay line while being another location in gaming machine 200. Information regarding the alignment of the home position of reel 210 with a target position of gaming machine 200 may be provided from detection means 230 to computer 240. This information may be realized as signals that specify the presence or non-presence of home position locator 220 at a specific location as reel 210 is moved in a rotational manner.

Computer 240 may be realized as a controller and a memory to manipulate the information from detection means 240 to generate signals to reel motor 250. These signals are used to move reel 210 to align the home position of reel 210 with the target position on gaming machine 200. The controller and memory of computer 240 may be under the control of a computer remote from gaming machine 200 using a communication network to which gaming machine 200 is coupled. Computer 240 may also be realized as a processor and a memory, in which the processor executes computer-executable instructions for performing an alignment method. The computer-executable instructions may be stored in the memory of computer 240. The memory of computer 240 may be realized in any of a number of formats as is known to those skilled in the art.

Reel motor 250 may turn reel 210 under the direction of computer 240 according to alignment instructions stored in computer 240 or in a remote computer to which gaming machine 200 is coupled by a communications network. In an embodiment, reel motor 250 moves reel 210 in increments by rotating the reel such that angular position moves in small amounts to "fine tune" the reel position and improve the reel alignment with respect to a target position such as a pay line. In an embodiment, reel motor 250 may change the position of reel 210 to one or more positions such that reel 210 moves a distance less than a length of a display symbol on reel 210. In embodiment, reel motor 250 is a stepper motor. The stepper motor may be configured to provide any number of increments to turn reel 210 one revolution.

Gaming machine 200 is configured such that detection means 230 provides alignment information to computer 240. Computer 240 or a remote computer coupled to gaming machine 200 has software to receive the information from detection means 230 and save the information. The saved information may include a value representing the distance that reel 210 is moved to adjust the home position of reel 210 to the target position of gaming machine 200. The saved information may include the number of increments used to adjust the home position of reel 210 to the target position of gaming machine 200. The number of increments may be determined in the detection means, in computer 240, or in a remote computer. Gaming machine 200 may be configured such that the information regarding the number of increments used in an alignment method may be used to offset the actual displayed position during game play.

Figure 3A:
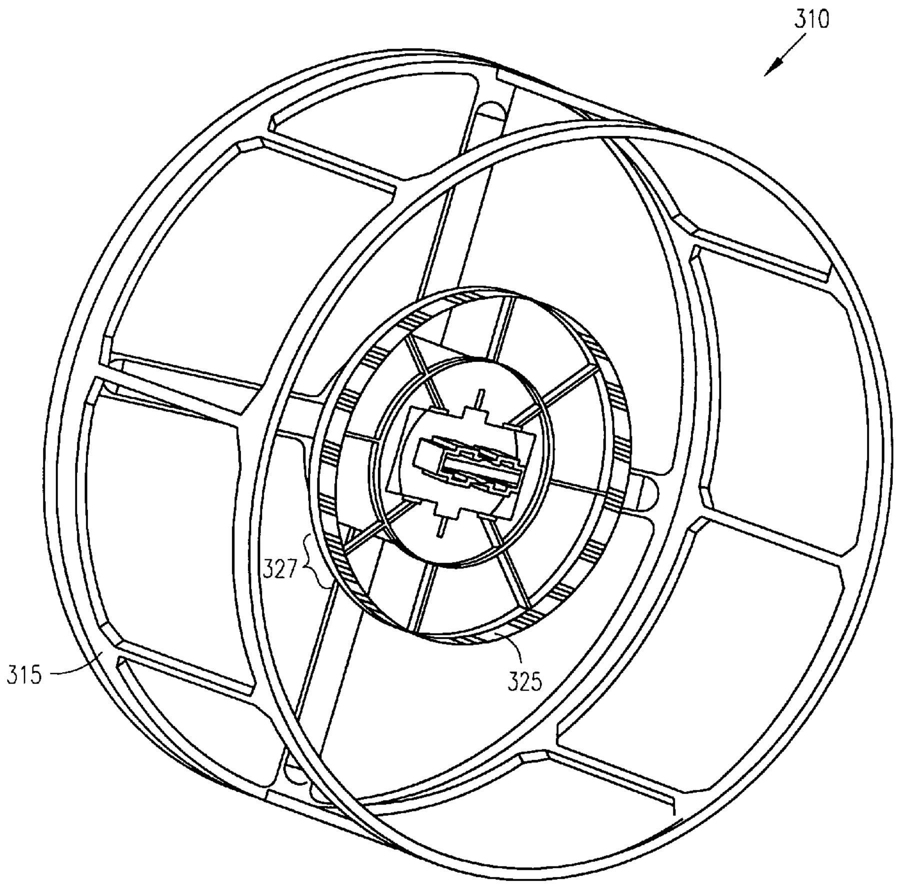
FIGS. 3A-3B illustrate an embodiment of a reel configured for use in a gaming machine in which a home position of the reel may be aligned with a target position of the gaming machine in which the reel is implemented, according to the teachings of the present invention.

FIG. 3A illustrates an embodiment of a reel 310 configured for use in a gaming machine in which a home position of reel 310 may be aligned with a target position of the gaming machine in which reel 310 is implemented. Reel 310 includes a reel cage 315 and an optical band 325, also referred to as optic strip 325. Optical band 325 has a home position indicator 327 that provides the home position for reel 310. A reel strip (not shown) may be disposed on reel cage 315. The reel strip can be exchanged with other reel strips depending on the game to be implemented in the gaming machine that is configured with reel 310. In an embodiment, the reel strip is positioned on reel cage 315 such that a home position location for the reel strip corresponds to the home position indicator 327 on optical band 325. In an embodiment, the home position of reel 310 is positioned such that during game play, the center of a reel symbol aligns with the pay line of the gaming machine using reel 310.

Figure 3B:
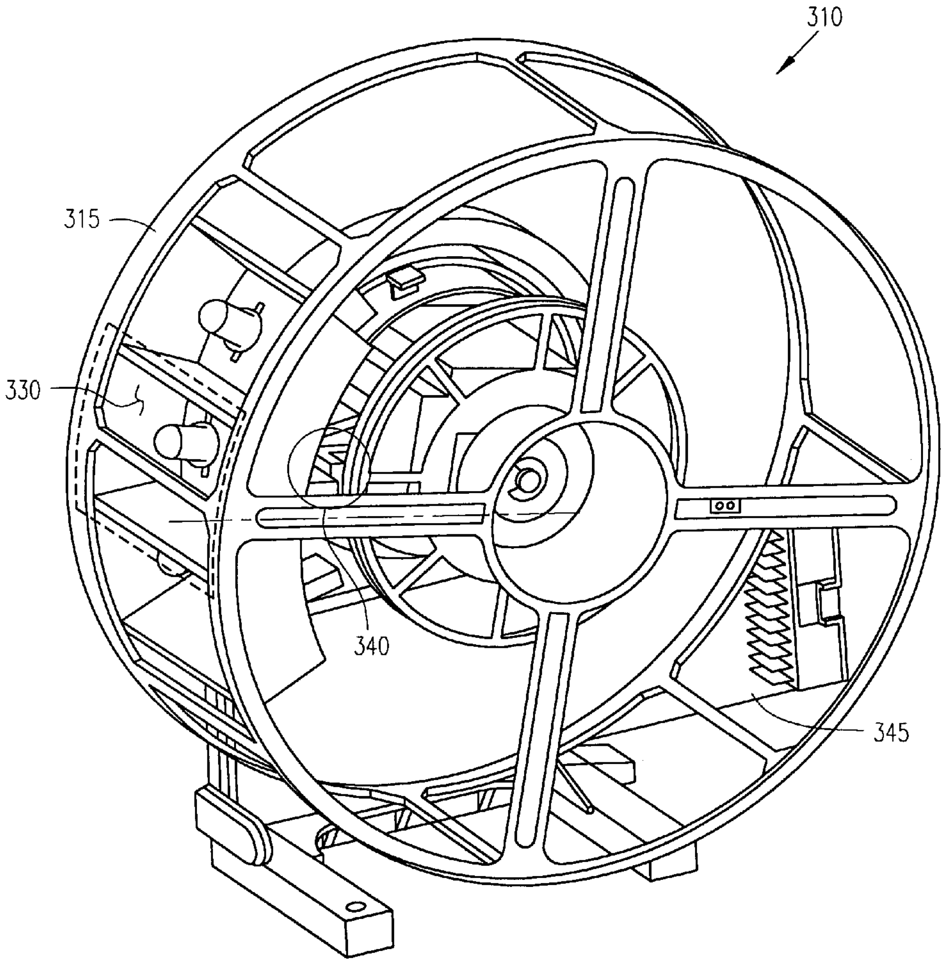

FIG. 3B illustrates an embodiment of reel 310 of FIG. 3A coupled to reel motor 335. Reel motor 335 is coupled to a mounting 345 that may provide electrical signals and power to reel motor 335. Reel 310 also includes an optic sensor 340 for determining that the home position of reel 310 aligns with a target position on a gaming machine in which reel 310 is configured. FIG. 3B also illustrates the relation of a reel symbol 330 to reel cage 315 of reel 310. In an embodiment, reel motor 335 is a stepping motor that provides a number of positions to move reel 310. In an embodiment, reel motor is a stepping motor that provides 200 steps or increments, or 400 half-step increments, for one revolution of reel 310. In an embodiment in which the number of reel symbols on a reel strip is small compared to the number of increments provided by reel motor 335, reel motor 335 provides a means for "fine tuning" the alignment of the home position of reel 310 with a target position of the gaming machine in which reel 310 is implemented.

A reel strip correlated to a specific game to be played in a selected gaming machine may be mounted on a reel for the selected gaming machine. A home position for the reel strip or a specific relation of the reel symbols on the reel strip is correlated to a home position on the reel. This correlation provides a registration of the reel strip with the home position of the reel. In an embodiment for a reel such as shown in FIGS. 3A, 3B, the registration of the reel strip to reel 310 is determined relative to home position indicator 327. In an embodiment, home position indicator 327 is realized as an optical indicator on optic strip 325. If the home position of the reel strip or specific relation of the reel symbols on the reel strip is misaligned with respect to home position indicator 327, the reel strip is out of registration with respect to home position indicator 327. For an out of registration reel strip with home position indicator 327 aligned with a target position on a gaming machine, the reel strip is misaligned with the target position on the gaming machine. Embodiments such as shown in FIG. 2 are configured to provide for the alignment of the home position of the reel strip to the target position of the gaming machine. With the home position of the reel strip aligned with the target position on the gaming machine, a home position for the reel as given by its home position indicator may not be aligned with the target position. Computer 240 of gaming machine 200 provides a means for storing the relative positions of the home position of the reel and the home position of a reel strip relative to each other and to a target position on gaming machine 200. In an embodiment, the target position of gaming machine 200 is a pay line.

Figure 4:
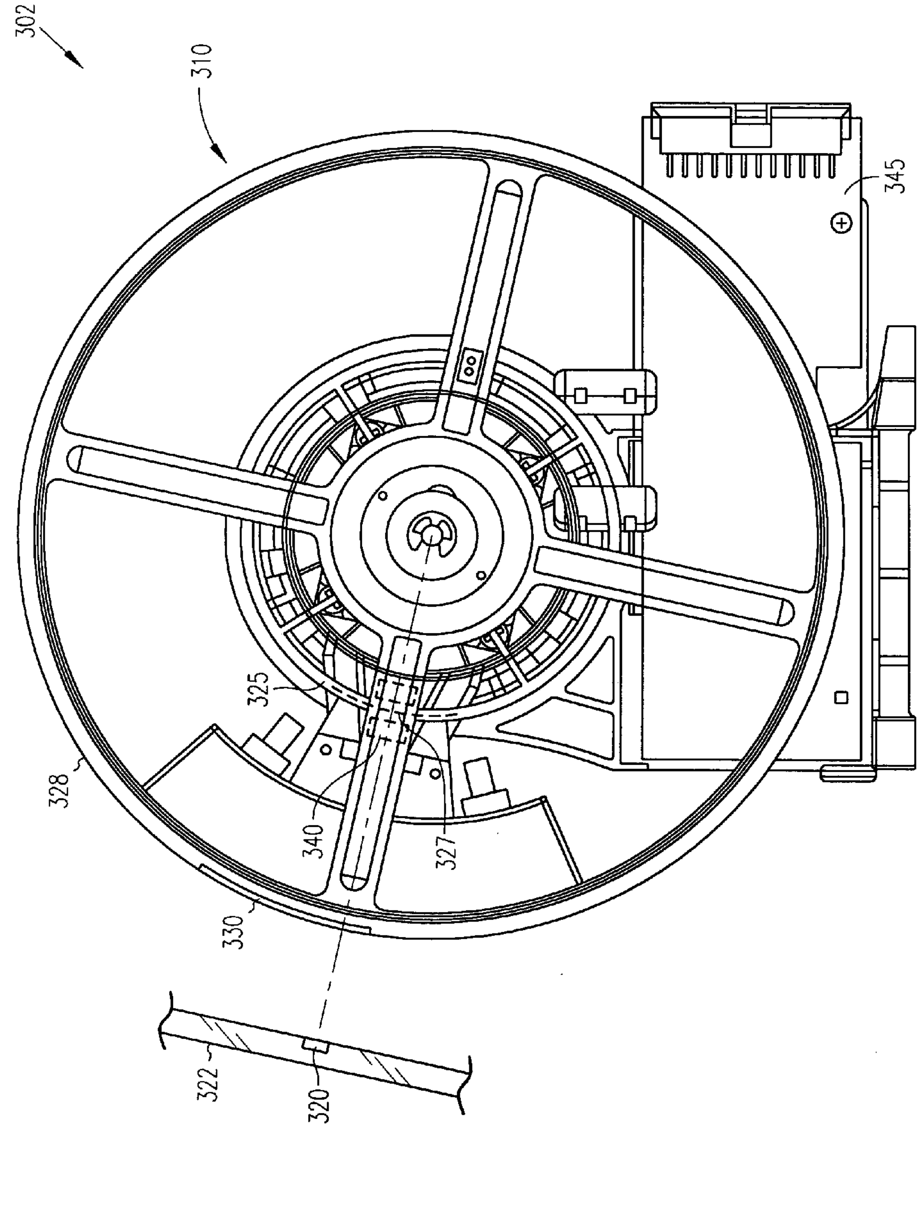
FIG. 4 illustrates an embodiment of the reel of FIGS. 3A, 3B mounted in a gaming machine where a reel strip mounted on the reel is out of registration with the reel, before the home position of the reel strip is aligned with a pay line of the gaming machine, according to the teachings of the present invention.

FIG. 4 illustrates an embodiment of reel 310 of FIGS. 3A, 3B mounted in a gaming machine 302 where reel strip 328 is out of registration with reel 310. Home position indicator 327 on optic band 325 of reel 310 is aligned with a pay line 320 of gaming machine 302. Pay line 320 is mounted on a reel glass 322 of gaming machine 302. The front of reel strip 328 has reel symbols imprinted on it that face reel glass 322 for viewing during game play. Gaming machine 302 is configured to adjust the alignment of the home position of reel strip 328 to pay line 320 using optic sensor 340 and optic band 325. Optic band 325 may include a code to be read to determine its position and provide feedback to a control system as part of an alignment routine. In an embodiment, optic band 325 is a clear optical strip with a code embedded at a specific position that represents the home position for the reel on which optic band is mounted. In other embodiments, the home position indicator 327 may be a magnetic device and optic sensor 340 may be replaced with a magnetic sensor. Alternately, home position indicator may be a form of indicia that may be sensed by a mechanical or electro-mechanical sensing unit.

As reel 310 is incrementally spun, the optic band 325 passes through the detection field of view of optic sensor 340. Reel motor 335 of reel 310, as shown in FIG. 3B, is used to incrementally spin, or rotate, reel 310. To align reel strip 328 for an out of registration condition where home position indicator 327 is aligned with pay line 320, reel motor 335 may move reel 310 to determine the location of the center of reel symbol 330 with respect to home position indicator 327. The center locations are sensed when these locations are positioned in the detection field of view of optic sensor 340. Optic sensor 340 may provide a signal or indication corresponding to alignment of a center location of reel strip 328 with home position indicator 327 to a control apparatus. With the information on the location of these centers, the amount of misalignment of the home position of reel strip 330 may be determined. In an embodiment, the amount of misalignment is measured in terms of the number of steps used by a stepping motor implemented as reel motor 335.

Alternate embodiments for registration alignment are provided by the various embodiments of gaming machines discussed herein. The term, registration alignment, is used to denote aligning a reel strip to a target position on a gaming machine where the reel strip is out of registration with respect to the reel on which it is mounted. Registration alignment may begin with home position indicator 327 in the body of reel 310 aligned with pay line 320 in an initial position as shown in FIG. 4. Reel 310 is moved until the presence of a home position indicator on the back of reel strip 328 is sensed by optic sensor 340. In an embodiment, reel strip 328 has a number of home position indicators. The number of home position indicators for reel strip 328 may equal the number of reel symbols. Having multiple home position indicators on reel strip 328 allows for ease in mounting a reel strip 328 to reel cage 315 in that a number of reel symbols may be used as a reference when mounting reel strip 328 to reel cage 315. Under computer control, the distance moved, from the initial position until the presence of a selected home position indicator of the reel strip is sensed, may be determined and stored in memory. The distance moved may be stored as a number of increments provided by reel motor 335.

Figure 5:
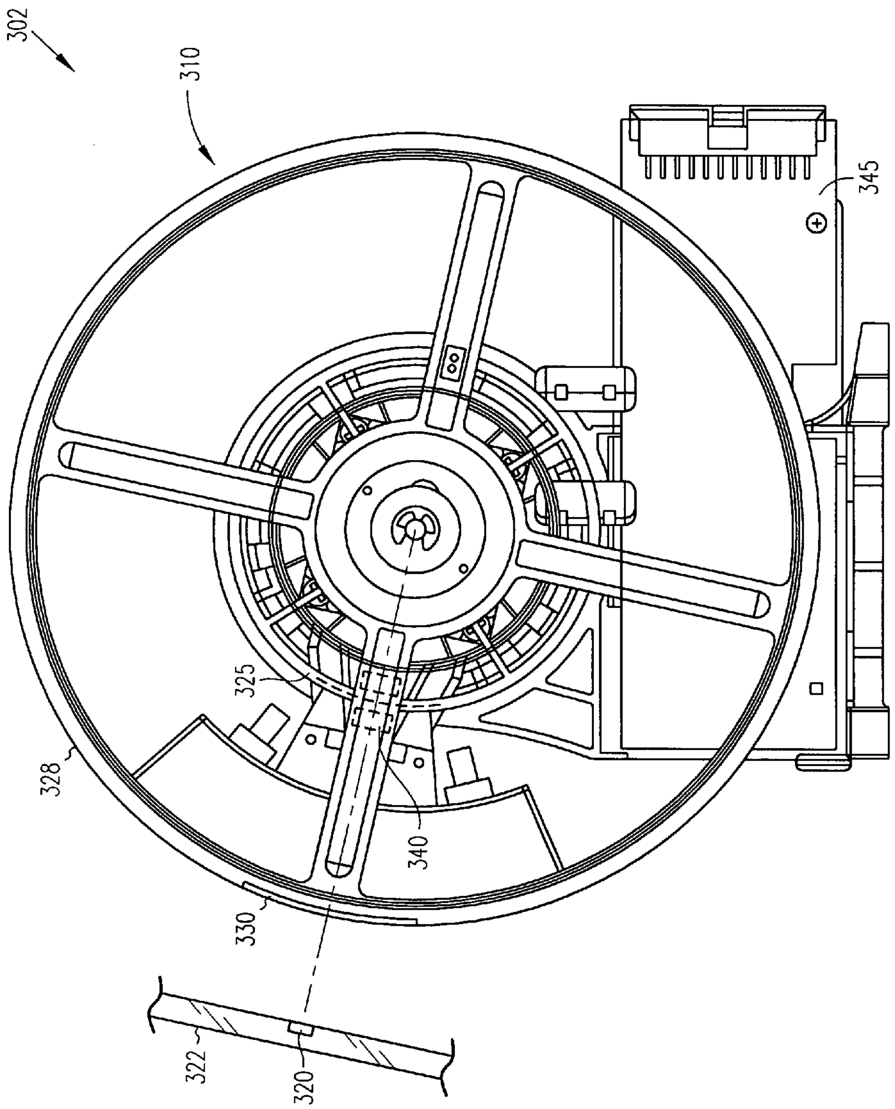
FIG. 5 illustrates an embodiment of the reel of FIG. 4 after the home position of the reel strip is aligned with the pay line of the gaming machine in which the reel is mounted, according to the teachings of the present invention.

FIG. 5 illustrates an embodiment of reel 310 of FIG. 4 after the home position of reel strip 328 is aligned with pay line 320 of gaming machine 302. FIGS. 4 and 5 demonstrate an embodiment in which reel 310 is angularly adjusted in small increments to provide the desired registration alignment. In an embodiment, reel motor 335 may change the position of reel 310 to one or more positions such that reel 310 moves a distance less than a length of a display symbol on reel 310. Control of reel motor 335 may be realized through use of a computer that also receives signals from optic sensor 340. The computer may be mounted in gaming machine 302 and coupled to reel motor 335 and optic sensor 340 through mounting 345. Alternately, reel motor 335 and optic sensor 340 may be coupled through mounting 345 to a communication network for communication with a distant computer.

Figure 6:
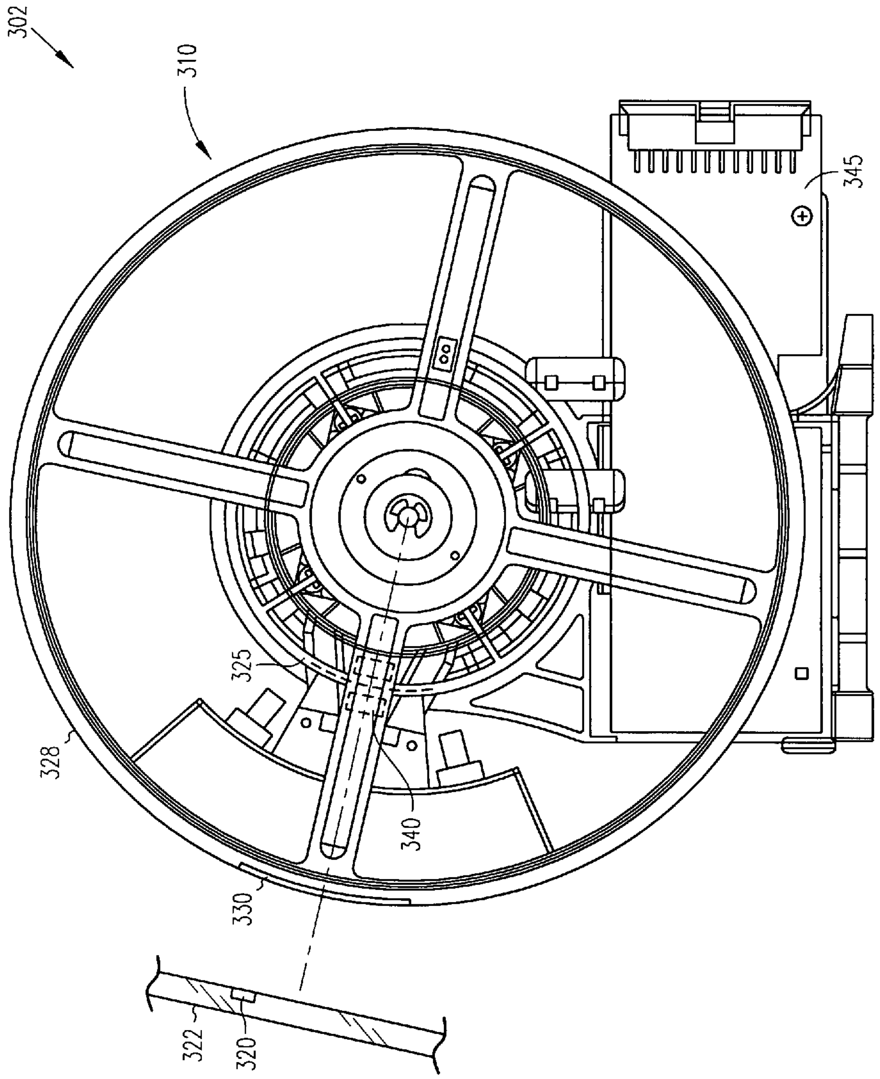
FIG. 6 illustrates an embodiment of the reel of FIGS. 3A, 3B mounted in a gaming machine where the home position of the reel is misaligned with the pay line of gaming machine in which the reel is mounted, according to the teachings of the present invention.

FIG. 6 illustrates an embodiment of reel 310 of FIGS. 3A, 3B mounted in a gaming machine 302 where the home position of reel 310 is misaligned with a pay line 320 of gaming machine 302. Unlike the situation of FIG. 4, reel strip 328 is in registration with reel 310. Pay line 320 is mounted on a reel glass 322 of gaming machine 302. Reel glass 322 permits the viewing of reel symbols imprinted on the front of reel strip 328 during game play. Gaming machine 302 is configured to adjust the alignment of the home position of reel 310 to pay line 320 using optic sensor 340 and optic band 325. In an embodiment, the home position for reel 310 is represented by a home position indicator 327 on optic band 325 as shown in FIG. 3A.

As reel 310 is incrementally rotated, the optic band 325 passes through the detection field of view of optic sensor 340. Reel motor 335 of reel 310, as shown in FIG. 3B, is used to incrementally spin, or rotate, reel 310. When home position indicator 327 is aligned in the detection field of view of optic sensor 340 with reel 310 stopped, the optic sensor provides a signal or indication corresponding to alignment of the home position of reel 310 with pay line 320 of gaming machine 302. Optic band 325 may include a code to be read to determine its position and provide feedback to a control system as part of an alignment routine. In an embodiment, optic band 325 is a clear optical strip with a code embedded at a specific position that represents the home position for the reel on which optic band is mounted. In other embodiments, the home position indicator 327 may be a magnetic device and optic sensor 340 may be replaced with a magnetic sensor. Alternately, home position indicator may be a form of indicia that may be sensed by a mechanical or electro-mechanical sensing unit.

Figure 7:
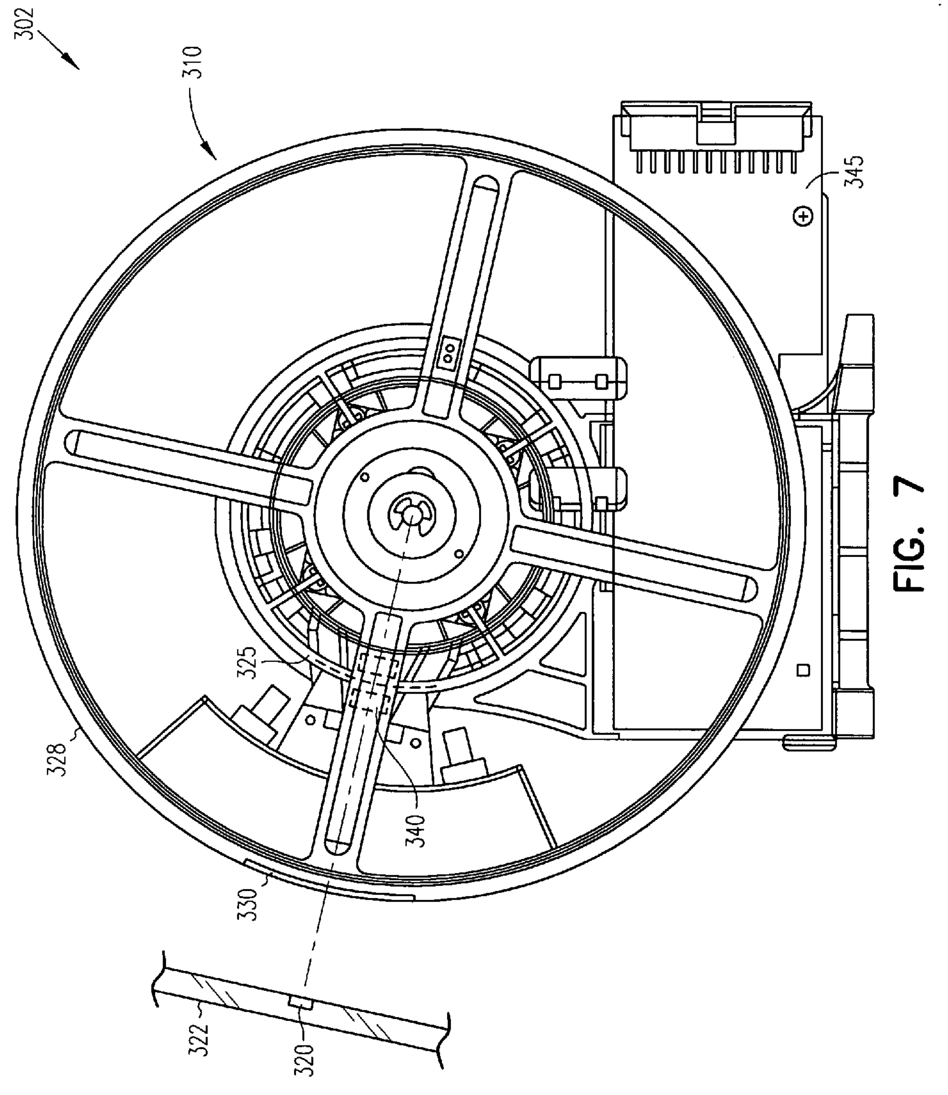
FIG. 7 illustrates an embodiment of the reel of FIG. 6 after the home position of the reel is aligned with the pay line of the gaming machine in which the reel is mounted, according to the teachings of the present invention.

FIG. 7 illustrates an embodiment of reel 310 of FIG. 6 after the home position of reel 310 is aligned with pay line 320 of gaming machine 302. FIGS. 6 and 7 demonstrate an embodiment in which reel 310 is angularly adjusted in small increments to provide the desired alignment. In an embodiment, reel motor 335 may change the position of reel 310 to one or more positions such that reel 310 moves a distance less than a length of a display symbol on reel 310. Reel motor 335 may rotate reel 310 either clockwise or counterclockwise. Control of reel motor 335 may be realized through use of a computer that also receives signals from optic sensor 340. The computer may be mounted in gaming machine 302 and coupled to reel motor 335 and optic sensor 340 through mounting 345. Alternately, reel motor 335 and optic sensor 340 may be coupled through mounting 345 to a communication network for communication with a distant computer.

Figure 8:
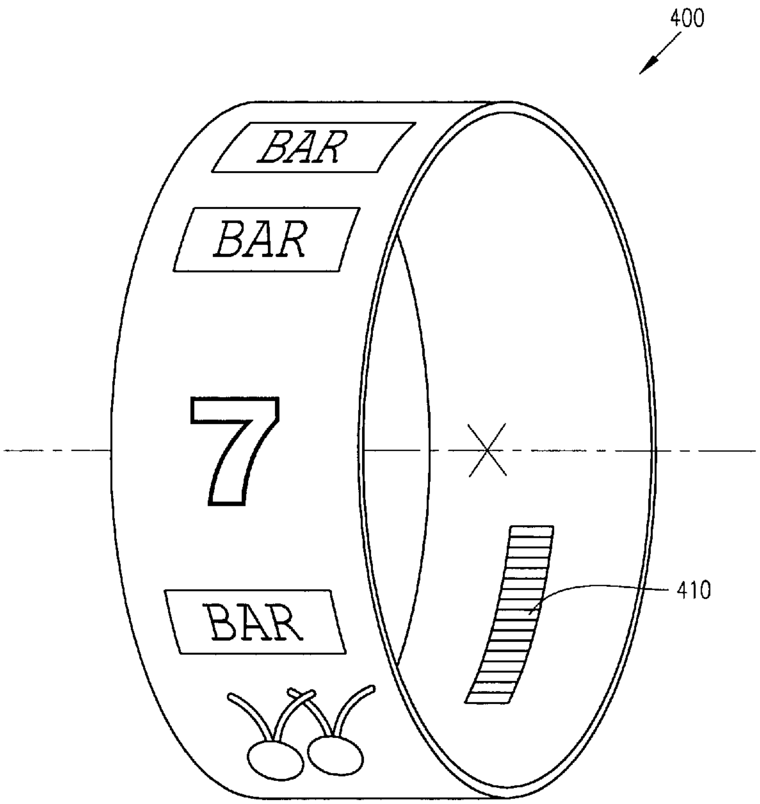
FIG. 8 depicts an embodiment of a reel strip having embedded information, according to the teachings of the present invention.

FIG. 8 depicts an embodiment of a reel strip 400 having embedded information 410. In an embodiment, reel strip 400 may be attached to a reel as shown in FIGS. 3-7. Embedded information 410 may provide a variety of data regarding reel strip 400 with respect to the reel on which it is attached and the gaming machine in which the reel is mounted. The embedded information 410 may include data correlating reel strip 400 installed in a gaming machine with game software installed on the same gaming machine. Such information allows diagnostic checks to verify that the proper equipment and software is being installed on a specific gaming machine. The data provided by the embedded information 410 may also be used to identify that reel strip 400 is installed in the correct reel in a gaming machine having multiple reels. Embedded information 410 may shorten the time required for reel assembly installations, and ensure the accuracy of the installation. The embedded information 410 may be used to provide a means for reading and reporting identifying information to determine the graphic content of reel strip 400. A system to test and/or control a gaming machine using the data from embedded information 410 may manage control apparatus and/or software for regulating the maintenance of the gaming machine for a variety of functions including, but not limited to, when reel strip 400 is in a wrong physical position, a wrong location in the gaming machine, and/or a wrong game where reel strip 400 does not match the game software. Such a system could be incorporated in the gaming machine or connected to the gaming machine through a communications network.

In an embodiment, embedded information 410 may be realized as an optical stripe pattern printed directly onto back of reel strip 400. Embedded information 410 may be realized as a bar code. Other embodiments include magnetic formats, mechanical structures, or similar identifiers that may be embedded on the back to correlate the installed strip to the installed game software and/or to identify that the reel strip is installed in the correct reel position or on the correct reel.

Figure 9:
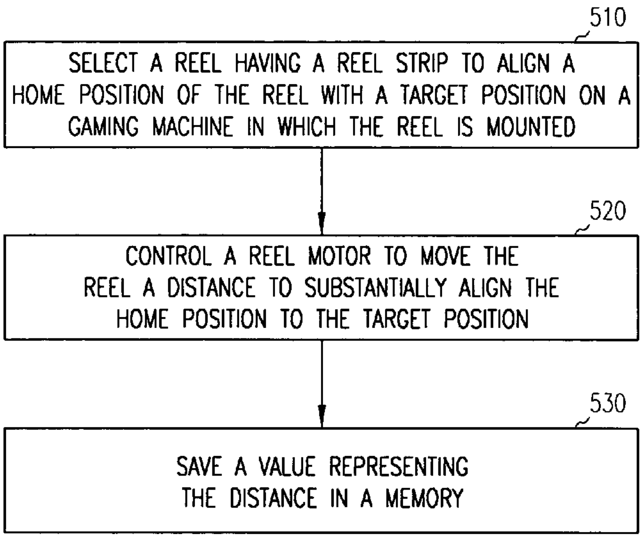
FIG. 9 shows a flow diagram of embodiment of a method for aligning a home position of a reel with a target position on the gaming machine in which the reel is configured, according to the teachings of the present invention.

FIG. 9 shows a flow diagram of embodiment of a method for aligning a home position of a reel with a target position on the gaming machine in which the reel is configured. Various embodiments including the embodiment of FIG. 9 may be implemented for a variety of reel embodiments including the embodiments depicted in FIGS. 1-8. At 510, a reel of gaming machine is selected to align a home position of the reel with a target position on the gaming machine. The target position may be a pay line of the gaming position. The home position may be a specific position within the reel or a specific position on a reel strip mounted to the reel. The home position may be provided by an optic strip home position mounted within the reel. In an embodiment, the home position of the reel is aligned such that in game play the center of a reel symbol of a reel strip mounted on the aligned reel is aligned along a pay line. In another embodiment, the home position of the reel is aligned such that in game play the bottom edge of a reel symbol is aligned along a pay line. Alternately, the home position of the reel is aligned such that in game play the top edge of a reel symbol is aligned along a pay line. The reel strip may be configured on the reel such that during the alignment process the home position of the reel and subsequently the reel strip is located at a specified position other than a reel symbol. In such an embodiment, a means for detecting the home position may use a home position indicator on the reel strip. In an embodiment, a reel is selected to align the reel strip with the target position on the gaming machine, where the reel strip is out of registration with the reel on which it is mounted. Using an optic sensor for detection, the home position and the pay line marked on a viewing glass of the gaming machine may be used to align the home position of the reel to the desired location with respect to the target position of the gaming machine.

With the gaming machine under computer control, selecting the reel to be alignment may begin by entering a secure set up mode provided by software that controls the gaming machine. The secure set up mode may be initiated through a graphics user interface under directions of an individual using the software to manage the gaming machine. The executable instructions may be stored in a computer system within the gaming machine or in a computer system remote from the gaming machine. Additionally, the user interface for managing the gaming machine may be located in the gaming machine or at a remote monitoring location. In an embodiment, the secure set up mode may be entered automatically by the computer during non-game play periods to perform tests and alignment procedures, based on the results of the test, under control of the software used to regulate the gaming machine. In an embodiment for managing the gaming machine under computer control, test data results and maintenance activities, such as aligning the home position of reels and reel strips in the gaming machine, may be recorded. The test and maintenance history of the gaming machine and its components may be communicated external to the gaming machine.

At 520, a reel motor is controlled to move the reel. In an embodiment, the reel motor is incremented to spin incrementally the selected reel. The movement of the selected reel may include the rotational movement of the reel cage about the center axis of the reel. This rotational movement may be clockwise or counterclockwise. Signals are provided to the reel motor to regulate the movement provided by the reel motor to move the reel a number of increments along its rotational path. The reel moves through a number of increments until the home position of the reel is substantially aligned with the target position on the gaming machine. In an alignment for a reel strip out of registration with its reel, the home position may be defined relative to the reel strip during the alignment with the pay line. The accuracy of the alignment depends on the "fine tuning" movement of the reel by the reel motor. In an embodiment using a stepping motor, the number of motor steps may include 360 increments in one revolution of the reel. Once the reel home position is substantially aligned with the target position on the gaming machine, the modified position may be accepted as the aligned position.

At 530, a value representing the distance moved to align the home position is saved in a memory. The value representing the distance may be realized as the number of increments used to position the reel to align its home position with a target location on the gaming machine, once the modified position is accepted as the aligned position. The home position may be a home position of the reel strip mounted on the reel. The target position may be associated with the pay line of the gaming machine. In an embodiment, once the re-alignment is completed and a "save to memory" command is given, the system controlling game play can access the alignment information, such as the number of steps incremented from an initial "home" in an alignment process. This information may be used to offset the actual displayed position during game play.

In various embodiments, variations of the method of FIG. 9 may be realized using a system such as a computer or other electronic device that executes computer-executable instructions for performing these methods. The computer-executable instructions may be provided using any form of computer readable medium. The computer-executable may include instructions for performing a registration alignment as a result of a reel strip being out of registration with its associated reel and instructions for performing an alignment as a result of a reel misaligned with the target position. In an embodiment, the computer-executable instructions may include computer-executable instructions to enter a set up mode to align a reel home position to a target location on the gaming machine. The computer-executable instructions may include computer-executable instructions to exit the set up mode to enter a game play mode and use the information acquired during the alignment procedure or other procedures in the set up mode.

The computer-executable instructions may include computer-executable instructions to incrementally rotate the reel to substantially center a display symbol on a reel strip on the reel with a pay line of the gaming machine. The computer-executable instructions may include computer-executable instructions to increment a reel motor for a number of increments to rotate the reel a distance less than a length of a display symbol on the reel. The computer-executable instructions may include computer-executable instructions to save information obtained in a set up mode, to process the data, and to provide the raw data and/or processed information on a graphics user interface on the gaming machine or a system coupled to the gaming machine. The computer-executable instructions may include computer-executable instructions to provide such data and information in a variety of formats including, but not limited to, printed formats, control signals for external systems, and various digital formats for storage on a variety of data storage units.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive, and that the phraseology or terminology employed herein is for the purpose of description and not of limitation. Combinations of the above embodiments, and other embodiments, will be apparent to those of skill in the art upon studying the above description. The scope of the present invention includes any other applications in which the above structures and fabrication methods are used. The scope of the present invention should be determined with reference to the appended claims, along with the full scope of equivalents to which such claims are entitled.

What is claimed is:

1. A computerized method comprising:

selecting, during a non-game play period, a mechanical reel having a physical reel strip to align a home position of the reel strip relative to a home position of the reel, with respect to a target position on a gaming machine in which the reel is physically mounted, the reel having a surface to hold the reel strip and having a physical band interior from the surface, the reel strip having a first indicator representing the home position of the reel strip, the band having a second indicator that represents the home position of the reel;

controlling a reel motor to physically move the reel such that the first and second indicators are sensed by an electronic sensor, during the non-game play period, the reel motor movement controlled using control signals received from a computer in which a processor executes instructions to determine misalignment of the home position of the reel strip with the home position of the reel;

automatically sending a signal, correlated to the sensed first indicator, from the electronic sensor to the computer to determine a distance of misalignment between the home position of the real strip and the home position of the reel; and saving a value representing the distance of misalignment in a memory of the computer.

2. The computerized method of claim 1, wherein controlling the reel motor to move the reel includes incrementing the reel motor for a number of increments to move the reel an angular distance, and saving the value representing the distance in the memory includes saving the number of increments in the memory.

3. The computerized method of claim 1, wherein the band includes a clear optical strip having a plurality of indicators, one of which is selected to be the second indicator to represent the home position of the reel.

4. The computerized method of claim 1, wherein the electronic sensor includes an optical sensor.

5. The computerized method of claim 1, wherein controlling the reel motor to move the reel includes rotating the reel to substantially center a display symbol on the reel strip as the first indicator with a pay line of the gaming machine.

6. The computerized method of claim 1, wherein sensing the first indicator includes sensing one of a plurality of indicators on the reel strip.

7. The method of claim 1, the method
includes sensing the second indicator to align the home position of the reel with respect to the target position.

8. The computerized method of claim 1, wherein selecting the reel includes selecting the reel to determine misalignment of the home position of the reel strip relative to a pay line on the gaming machine.

9. The computerized method of claim 1, wherein the instructions to determine misalignment of the home position of the reel strip with the home position of the reel are stored in the gaming machine.

10. The computerized method of claim 1, wherein the method further includes entering a set up mode before selecting the reel.

11. The computerized method of claim 10, wherein the method further includes:
exiting the set up mode after saving the value in the memory;
entering a game play mode;
accessing the memory to retrieve the value; and
applying the value to offset a displayed position of the reel during the game play mode.

12. The computerized method of claim 7, wherein the target position of the reel is correlated to a pay line on the gaming machine.

13. The computerized method of claim 1, wherein the method includes reading an optical stripe pattern printed on the reel strip to identify the reel strip.

14. The computerized method of claim 13, wherein
reading the optical stripe pattern includes reading a bar code.

15. The computerized method of claim 1, wherein sensing the home position of the reel strip includes sensing the first indicator on a back of the reel strip facing the band.

16. A non-transitory computer-readable storage medium having computer-executable instructions stored thereon, which instructions when executed by a processor perform a method comprising:
selecting, during a non-game play period, a mechanical reel having a physical reel strip to align a home position of the reel strip relative to a home position of the reel with respect to a target position on a gaming machine in which the reel is physically mounted, the reel having a surface to hold the reel strip and having a physical band interior from the surface, the reel strip having a first indicator representing the home position of the reel strip, the band having a second indicator that represents the home position of the reel;
controlling a reel motor to physically move the reel such that the first and second indicators are sensed by an electronic sensor, during the non-game play period, the reel motor movement controlled using control signals received from a computer in which the computer-readable storage medium is capable of operating with a processor of the computer to execute instructions to determine misalignment of the home position of the reel strip with the home position of the reel;
processing a signal, correlated to the sensed first indicator, automatically sent from the electronic sensor to the computer to determine a distance of misalignment between the home position of the real strip and the home position of the reel; and
saving a value representing the distance in a memory of the computer.

17. The non-transitory computer-readable storage medium of claim 16, wherein controlling the reel motor to move the reel includes incrementing the reel motor for a number of increments to move the reel an angular distance, and saving the value representing the distance in a memory includes saving the number of increments in the memory.

18. The non-transitory computer-readable storage medium of claim 16, wherein the band includes a clear optical strip having an embedded code.

19. The non-transitory computer-readable storage medium of claim 16, wherein the instructions include reading an optical stripe pattern printed on the reel strip to identify the reel strip.

20. The non-transitory computer-readable storage medium of claim 16, wherein the target position is associated with a pay line on the gaming machine.

21. The non-transitory computer-readable storage medium of claim 16, wherein the computer-readable medium is located in the gaming machine.

22. The non-transitory computer-readable storage medium of claim 16, wherein the computer-readable medium further includes computer-executable instructions to enter a set up mode before selecting the reel.

23. The non-transitory computer-readable storage medium of claim 22, wherein the computer-readable medium includes computer-executable instructions to execute the method further including:
exiting the set up mode after saving the value in the memory;
entering a game play mode;
accessing the memory to retrieve the value; and
applying the value to offset a displayed position of the reel during the game play mode.

24. The non-transitory computer-readable storage medium of claim 16, wherein the instructions include controlling the reel motor to physically move the reel such during the non-game play period the second indicator is sensed to align the home position of the reel with respect to the target position using control signals received from the computer.

25. A gaming machine comprising:
a mechanical reel having a surface to hold a physical reel strip and having a physical band interior from the surface, the reel strip having a first indicator representing a home position of the reel strip, the band having a second indicator that represents a home position of the reel;
an electronic sensor arranged to operatively sense the second indicator and to operatively sense the first indicator with the reel strip mounted on the reel to provide a signal indicating the sensed first indicator to determine a misalignment of the home position of the reel strip relative to the home position of the reel with respect to a target position on the gaming machine in a non-game play period;
a computer operatively coupled to the electronic sensor to receive the signal automatically sent from the electronic sensor, the signal correlated to the misalignment, the computer having stored instructions and a processor to execute the stored instructions, the stored instructions including instructions to control the determination of the misalignment; and
a reel motor to physically rotate the reel such that the first and second indicators are sensed by the electronic sensor during the non-game play period using control signals received from the computer such that control of moving the reel to determine an amount of misalignment of the home position of the reel strip relative to the reel is under control of the computer responsive to the signal received from the electronic sensor.

26. The gaming machine of claim 25, wherein the reel includes the reel strip attached to the surface.

27. The gaming machine of claim 26, wherein the gaming machine is configured to compensate under software control for an out of registration condition of the reel strip with respect to the reel.

28. The gaming machine of claim 25, wherein the band includes an optic strip having an embedded code as the second indicator.

29. The gaming machine of claim 25, wherein the electronic sensor includes an optical detector.

30. The gaming machine of claim 25, wherein the gaming machine includes a memory to store information for controlling the reel motor to determine misalignment of the home position of the reel strip with the home position of the reel.

31. The gaming machine of claim 25, wherein the gaming machine is adapted to use information acquired in an alignment procedure to offset a displayed position of the reel strip during a game play mode.

32. The gaming machine of claim 25, wherein the target position is correlated to a pay line of the gaming machine.

33. The gaming machine of claim 25, wherein the gaming machine includes a controller and a memory in a housing of the gaming machine containing the reel.

34. The gaming machine of claim 25, wherein the computer includes software located external to a housing of the gaming machine containing the reel.

35. The gaming machine of claim 25, wherein the computer is configured to operatively couple to the electronic sensor and to the reel motor over a network.

36. The gaming machine of claim 25, wherein the band includes a clear optical strip having a plurality of indicators from which to operatively select the second indicator.

* * * * *

UNITED STATES PATENT AND TRADEMARK OFFICE

CERTIFICATE OF CORRECTION

PATENT NO. : 8,277,304 B1
APPLICATION NO. : 10/932769
DATED : October 2, 2012
INVENTOR(S) : Rasmussen et al.

It is certified that error appears in the above-identified patent and that said Letters Patent is hereby corrected as shown below:

In column 6, line 21, delete “330” and insert --328--, therefor

In column 11, line 24, in claim 12, after “position”, delete “of the reel”, therefor Signed and Sealed this
Twenty-seventh Day of November, 2012

David J. Kappos
*Director of the United States Patent and Trademark Office*